United States Patent
McCoy et al.

(10) Patent No.: US 8,201,730 B1
(45) Date of Patent: *Jun. 19, 2012

(54) BANKING SYSTEM CONTROLLED RESPONSIVE TO DATA BEARING RECORDS

(75) Inventors: Donald McCoy, Uniontown, OH (US);
Donald Parsons, Akron, OH (US);
Judith Edwards, Canton, OH (US);
James Block, N. Lawrence, OH (US)

(73) Assignee: Diebold Self-Service Systems division of Diebold, Incorporated, North Canton, OH (US)

(*) Notice: Subject to any disclaimer, the term of this patent is extended or adjusted under 35 U.S.C. 154(b) by 205 days.

This patent is subject to a terminal disclaimer.

(21) Appl. No.: 12/799,472

(22) Filed: Apr. 26, 2010

Related U.S. Application Data

(62) Division of application No. 10/620,911, filed on Jul. 15, 2003.

(60) Provisional application No. 60/396,607, filed on Jul. 16, 2002.

(51) Int. Cl.
*G06Q 40/00* (2006.01)
*G07D 11/00* (2006.01)
*G07F 19/00* (2006.01)

(52) U.S. Cl. ........ 235/379; 235/375; 235/487; 235/382; 705/42; 705/43

(58) Field of Classification Search .......... 235/379, 235/382, 375, 380, 492, 487; 902/8, 14, 902/37–41; 705/42
See application file for complete search history.

(56) References Cited

U.S. PATENT DOCUMENTS

| | | | |
|---|---|---|---|
| 5,475,839 A | 12/1995 | Watson et al. | |
| 5,793,943 A | 8/1998 | Noll | |
| 5,860,001 A | 1/1999 | Cromer et al. | |
| 5,937,063 A | 8/1999 | Davis | |
| 6,088,794 A | 7/2000 | Yoon et al. | |
| 6,185,696 B1 | 2/2001 | Noll | |
| 6,240,519 B1 | 5/2001 | James et al. | |
| 6,539,473 B1 | 3/2003 | Hubacher et al. | |
| 6,581,162 B1 | 6/2003 | Angelo et al. | |
| 6,651,188 B2 | 11/2003 | Harding et al. | |
| 6,691,160 B1 | 2/2004 | Bradley | |
| 6,745,329 B1 | 6/2004 | Kao | |
| 6,748,525 B1 | 6/2004 | Hubacher et al. | |
| 6,892,323 B2 | 5/2005 | Lin | |
| 6,925,557 B2 | 8/2005 | Cromer et al. | |

(Continued)

OTHER PUBLICATIONS

"Open-Platform Boot Software Eases Development", J. Child, Journal Electronic Design, vol. 46, No. 15, p. 48, 52, 54, dated Jun. 22, 1998.

(Continued)

*Primary Examiner* — Edwyn Labaze
(74) *Attorney, Agent, or Firm* — Christopher L. Parmelee; Ralph E. Jocke; Walker & Jocke

(57) ABSTRACT

An automated banking machine operates responsive to data read from data bearing records to cause financial transfers. The machine includes a card reader that operates to read card data from user cards. The card data corresponds to financial accounts. The automated banking machine includes a cash dispenser and the machine carries out transaction functions for consumers including dispensing cash. The machine may be configured such that when an alternative bootable media is detected, the computer is operative to prompt a user to input a bios boot password.

18 Claims, 5 Drawing Sheets

U.S. PATENT DOCUMENTS

| | | | |
|---|---|---|---|
| 6,929,176 B2 * | 8/2005 | Wiggins | 235/379 |
| 6,988,193 B2 | 1/2006 | French et al. | |
| 7,024,550 B2 | 4/2006 | Collins et al. | |
| 7,069,431 B2 | 6/2006 | Dayan et al. | |
| 2002/0166072 A1 | 11/2002 | Cromer et al. | |

OTHER PUBLICATIONS

"Sino Source Debuts Pentium Notebook", Computerworld Hong Kong, dated Nov. 24, 1994, p. 46.

* cited by examiner

US 8,201,730 B1

BANKING SYSTEM CONTROLLED RESPONSIVE TO DATA BEARING RECORDS

CROSS REFERENCE TO RELATED APPLICATIONS

This Application is a divisional of co-pending application Ser. No. 10/620,911 filed Jul. 15, 2003. Application Ser. No. 10/620,911 claims benefit pursuant to 35 U.S.C. §119(e) of Provisional Application 60/396,607 filed Jul. 16, 2002.

TECHNICAL FIELD

This invention relates to automated banking machines that operate responsive to data read from user cards and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. Automated banking machines may benefit from improvements.

OBJECTS OF EXEMPLARY EMBODIMENTS

It is an object of an exemplary embodiment to provide an automated banking machine at which a user may conduct transactions.

It is a further object of an exemplary embodiment to provide an automated banking machine that is more resistant to being attacked by an unauthorized user.

It is a further object of an exemplary embodiment to provide an automated banking machine that may boot from different devices.

It is a further object of an exemplary embodiment to provide an automated banking machine that is operative to prevent an unauthorized user from using a portable bootable media to access the computer of the machine.

Further objects of exemplary embodiments will be made apparent in the following Detailed Description of Exemplary Embodiments and the appended claims.

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The type of banking transactions a customer can carry out are determined by capabilities of the particular machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers checks. For purposes of this disclosure references to an ATM, an automated banking machine or automated transaction machine shall encompass any device which carries out transactions including transfers of value.

Some hardware settings of a computer of an ATM may be configured through a basic input/output system (BIOS) program. The BIOS program enables a user to modify the hardware settings stored in a ROM or flash memory chip of the ATM computer. Such hardware settings may configure the display screen, disk drives, keyboard, serial communications, and other hardware devices and functions of the ATM computer.

ATMs generally include a computer and a plurality of bootable storage device drives in operative connection with the computer. Such bootable storage device drives may include, for example, a hard drive, a floppy disk drive, and a CD-ROM drive. The computer of the ATM may be operative to boot up or load an operating system responsive to the boot information or boot record read from the bootable media associated with any one of these storage device drives. Such a boot record generally instructs the computer as to where to find an operating system or other program to boot. The hardware settings configured with a BIOS of an ATM computer may specify which storage device drives to attempt to boot from. In addition, the hardware settings configured with a BIOS of an ATM computer may specify the particular order of storage device drives to attempt to boot from. For example, an order of bootable storage device drives configured in a BIOS of an ATM computer may include: 1) the floppy disk drive; 2) the CD-ROM drive; and 3) the hard drive. Responsive to such a boot order, the ATM may first attempt to boot from a floppy disk bootable media within the floppy disk drive. If a floppy disk bootable media is not located in the floppy disk drive, the ATM responsive to the boot order may attempt to boot from a CD-ROM bootable media in the CD-ROM drive. If the CD-ROM bootable media is not located in the CD-ROM drive, the ATM responsive to the boot order may attempt to boot from the hard drive bootable media.

This behavior of trying to boot from different bootable media responsive to a specified order of bootable media and/or their respective storage device drives set in a BIOS may be useful to an authorized user attempting to service an ATM. For example, if a new hard drive of an ATM is installed, an installation of a new operating system on the new hard drive can be initiated by booting from a setup floppy disk, CD-ROM, or other portable bootable media. Unfortunately, this booting behavior of an ATM computer can have negative consequences. For example, if the setup CD-ROM is accidently left in the CD-ROM drive, the next time the ATM is restarted the ATM may load the setup program from the CD-ROM rather than loading the terminal control software from the hard drive.

In addition, although many ATMs include the computer in a secure safe or chest of the ATM, other ATMs may include the computer outside the chest. Although such a computer outside the chest may still be located behind a locked enclosure or fascia, such an enclosure is often significantly less secure than a chest. As a result, an unauthorized user may be able to open the enclosure to access the ATM computer. An unauthorized user who gains access to the CD-ROM drive or floppy disk drive, could insert a CD-ROM or floppy disk with malicious software. If the BIOS is configured to boot the ATM computer from the CD-ROM drive and/or floppy disk drive prior to booting from the hard drive, the unauthorized user may be able to load the malicious software in the computer of the ATM. Such malicious software could be in the form of a virus or worm that is operative to cause the ATM to dispense cash. Such malicious software could also be in the form of a sniffer program which intercepts secret information, such as account numbers, and reports the information to the unauthorized user.

Consequently, there exists a need for an automated banking machine that is more secure. There further exists a need for an automated banking machine that is more resistant to being attacked by an unauthorized user. In addition, there exists a need for an automated banking machine that is operative to prevent an unauthorized user from using portable bootable media to access the computer of a machine.

The foregoing objects may be accomplished in an exemplary embodiment by an automated banking machine, ATM or other automated transaction function machine, which includes output devices such as a display screen and receipt printer. The machine may further include input devices, such as a touch screen, keyboard, keypad, function keys and card reader. In addition, the automated banking machine may include a plurality of storage device drives, such as a hard drive, floppy disk drive and CD-ROM drive. The automated banking machine may further include transaction function devices, such as a cash dispenser mechanism for sheets of currency, a depository mechanism and other transaction function devices which are used by the machine in carrying out banking transactions, including transfers of value.

In the exemplary embodiment, the automated banking machine may include at least one computer. The computer may be in operative connection with the output devices, the input devices and the storage device drives, as well as with the cash dispenser mechanism, depository mechanism and other physical transaction function devices in the banking machine. The computer may further be operative to communicate with a host system located remotely from the machine.

In the exemplary embodiment, the computer may include software programs that are executable therein. The software programs of the automated banking machine may be operative to cause the computer to output user interface screens through a display device of the machine. The user interface screens may include consumer screens which provide a consumer with information for performing consumer operations, such as banking functions, with the machine. The user interface screens may further include service screens which provide an authorized user servicing the machine with information for performing service and maintenance operations with the machine. In addition, the machine may further include software programs operative in the computer for controlling and communicating with hardware devices of the machine, including the transaction function devices.

In one exemplary embodiment, the computer of an automated banking machine, such as an ATM, may include a BIOS program that is operative to configure hardware settings of the computer. Such a BIOS configuration may be stored in a ROM, flash memory or other nonvolatile memory of the computer. When the computer of the ATM is started or is restarted, the computer is operative to boot responsive to the BIOS. In an exemplary embodiment, the BIOS program may include a BIOS program password. To load the BIOS program to make changes to the BIOS configuration, the BIOS may be operative to prompt a user to input the BIOS program password through an input device of the machine. If the inputted password matches a BIOS program password stored in the BIOS, the BIOS program is operative to enable the user to make changes to the BIOS configuration. Such changes may include changing the boot sequence of the bootable storage device drives of the ATM. Such changes may also include changing the BIOS program password to a different password.

In the exemplary embodiment, the computer of the ATM may include at least one boot password stored in the BIOS, which is required to be inputted by a user prior to booting one or more storage device drives of the ATM. In addition, the computer may be operative to specify in the BIOS which of the storage device drives corresponds to a default storage device drive, which does not require the input of the boot password stored in the BIOS, and which of the storage device drives correspond to alternative storage device drives which require the input of the boot password. When the computer of the ATM detects a bootable media in one of the alternative storage device drives, the computer is operative to prompt a user to input the boot password. If the user inputs a password which corresponds to the boot password stored in the BIOS, then the ATM computer may boot responsive to the boot record on boot media in the alternative storage device drive.

In the exemplary embodiment, if a password is not entered within a predetermined period of time, or an incorrect password is entered at least once, the computer is operative to automatically boot responsive to the boot record of the boot media of the default storage device drive. However, in alternative exemplary embodiments, when the computer detects that there is a second alternative bootable media, then after the predetermined period of time has elapsed for the first alternative bootable media, the computer may prompt the user to enter a password for the second alternative bootable media. In an exemplary embodiment, when the computer of the ATM determines that no bootable media is located in any of the alternative storage device drives, the ATM computer is operative to automatically boot responsive to a boot record on the bootable media of the default storage device drive specified in the BIOS, without requiring a user to input the boot password.

In an exemplary embodiment, the order for booting from the storage device devices may correspond to a boot order that is specified in the BIOS. In exemplary embodiments, all alternative storage device drives may require the same boot password. In alternative exemplary embodiments, each alternative storage device drive may be associated with its own password stored in the BIOS, which may be different for each alternative storage device drive.

DETAILED DESCRIPTION OF EXEMPLARY EMBODIMENTS

Figure 1:
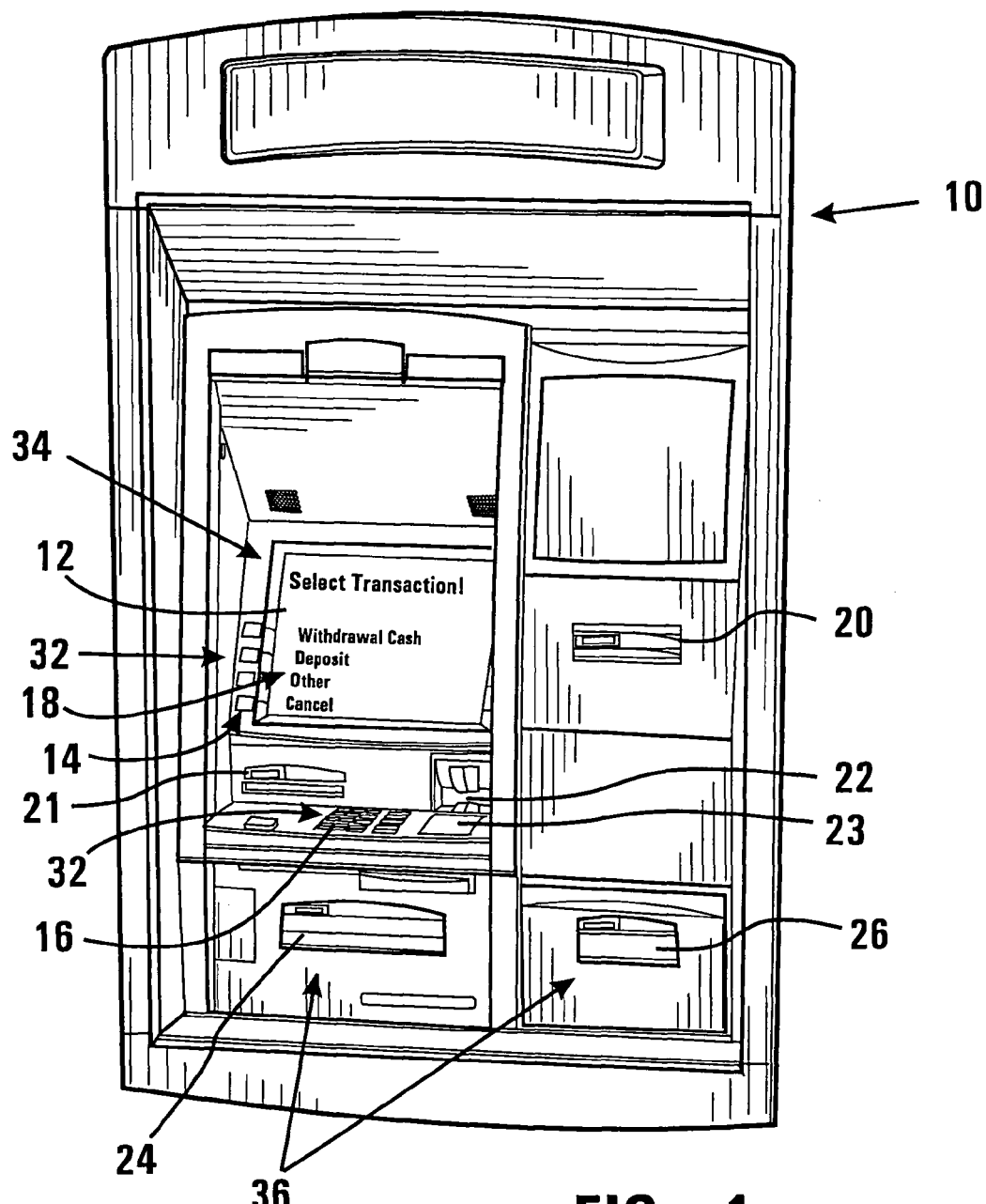
FIG. 1 is a perspective view representative of an exemplary embodiment of an automated banking machine.

Referring now to the drawings and particularly to FIG. 1, there is shown therein a perspective view of an exemplary embodiment of an automated banking machine 10. Here the automated banking machine 10 may include at least one output device 34 such as a display device 12. The output device 12 may be operative to provide a consumer with a user interface 18 that may include a plurality of screens or other outputs including selectable options for operating the machine. The exemplary embodiment may further include other types of output devices such as a receipt printer 20, statement printer 21, speakers, or any other type of device that is capable of outputting visual, audible, or other sensory perceptible information.

The exemplary embodiment of the automated banking machine 10 may include a plurality of input devices 32 such as an encrypting pin pad (EPP) with keypad 16 and function keys 14 as well as a card reader 22 and/or bar code reader 23. The exemplary embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The exemplary embodiment of the automated banking machine 10 may further include a plurality of transaction function devices which may include for example a cash dispenser 24, a depository mechanism 26, a cash recycler mechanism, or any other type of device which is operative to perform transaction functions involving transfers of value.

Figure 2:
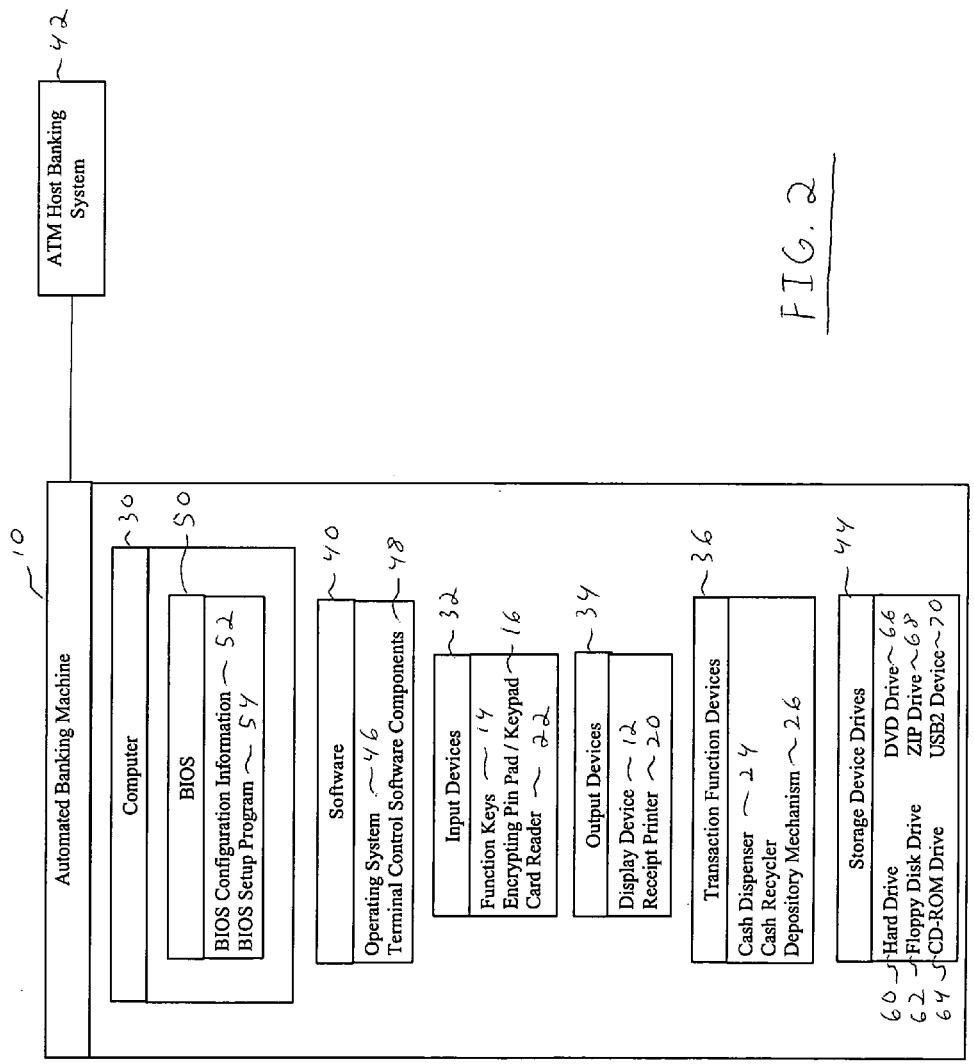
FIG. 2 is a schematic view of an exemplary embodiment of an automated banking machine.

FIG. 2 shows a schematic view of components which may be included in the automated banking machine 10. The machine 10 may include at least one computer 30. The computer 30 may be in operative connection with the input device(s) 32, the output device(s) 34 and the transaction function device(s) 36. The exemplary embodiment may further include software components 40 that are operative in the computer 30. Such software components may include an operating system 46 and at least one terminal control software component 48. The terminal control software components 48 may be operative to control the operation of the machine by both a consumer and an authorized user, such as a service technician. For example, such terminal control software components may include applications which enable a consumer to dispense cash, deposit a check or perform other transaction functions with the machine. In addition, the terminal control software components may include applications which enable a service technician to perform configuration, maintenance and diagnostic functions with the machine.

Exemplary embodiments of the automated banking machine 10 are operative to communicate with a transaction processing server, which is referred to herein as an ATM host banking system 42. Such an ATM host banking system 42 is operative to authorize the automated banking machine 10 to perform transaction functions for users, such as withdrawing cash from an account through operation of the cash dispenser 24, depositing checks or other items with the depository mechanism 26, performing a balance inquiry for a financial account and transferring value between accounts.

Exemplary embodiments of the automated banking machine 10 may include a plurality of storage device drives 44 in operative connection with the computer. Examples of storage device drives 44 include a hard drive 60, floppy disk drive 62, CD drive 64, DVD drive 66, Iomega ZIP® drive 68 and a bus/port device 70, such as a USB hard drive. In an exemplary embodiment, at least two of the storage device drives are bootable. As defined herein, a bootable device includes or may include at least one bootable media which includes a boot record. The boot record may include information which is used to boot an operating system. In an exemplary embodiment, the computer may be operative to boot an operating system responsive to the boot record of a bootable media of a storage device drive. For a floppy disk drive 62, such bootable media may include a floppy disk. For a CD drive 64, such bootable media may include a CD. For a hard drive device 60, the bootable media may correspond to the internal platters within the hard drive.

In an exemplary embodiment, the hard drive 60 of the machine may include a copy of the operating system 46 and the terminal control software components loaded therein. A boot record for the hard drive 60 may include information in a first sector of the hard drive, which causes the computer to run the operating system 46 installed on the hard drive.

Exemplary embodiments of the computer 30 of the automated banking machine may include a BIOS 50. The BIOS 50 may include configuration information 50 associated with the operation of the computer. Such configuration information 50 may be stored in a ROM, flash memory device or other non-volatile memory of the computer. The BIOS 50 may also include a BIOS setup program 54, which enables a user to modify the configuration information. The computer 50 may be operative to execute the BIOS setup program responsive to at least one input to an input device of the machine. Such an input may include pressing one or more keys of the keyboard when the computer of the machine is initially started or restarted.

Figure 3:
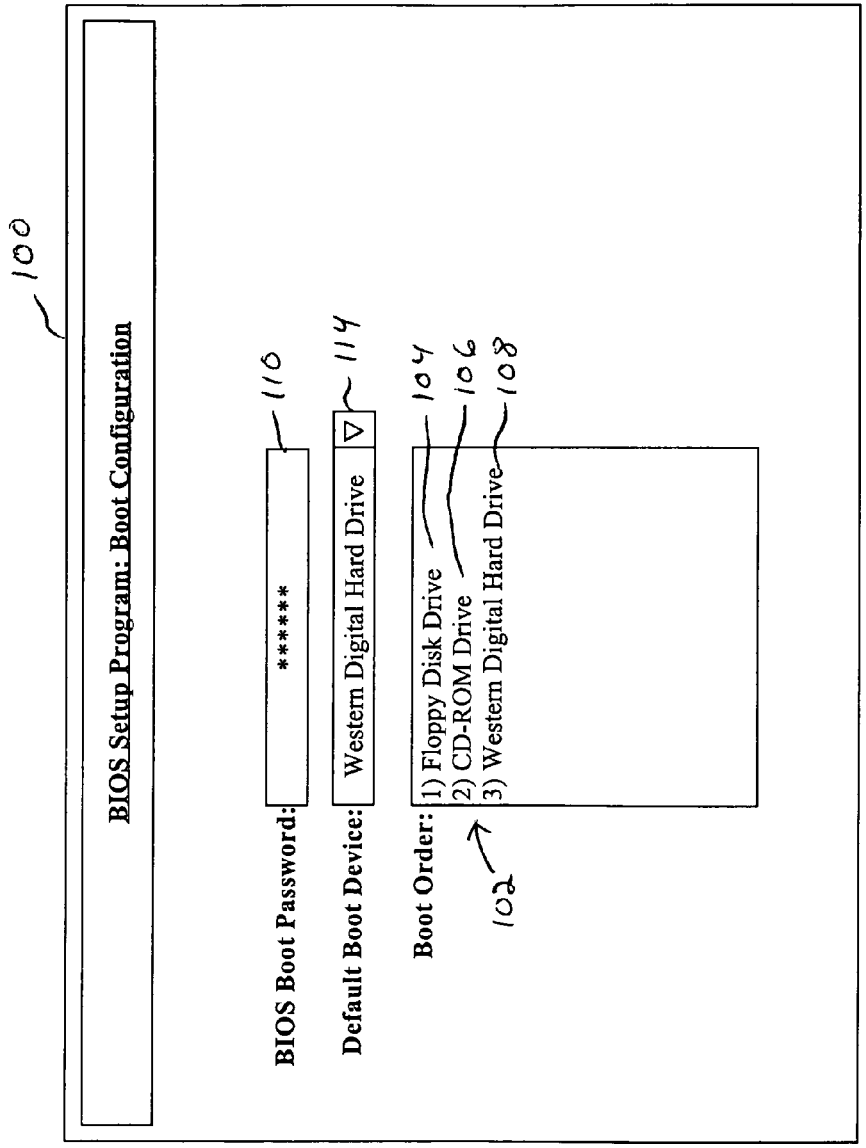
FIG. 3 shows an exemplary embodiment of a BIOS configuration screen.

When the automated banking machine includes more than one storage device drive, the computer may determine which storage device drive 44 to boot from, responsive to the BIOS configuration information. FIG. 3 shows an example of a BIOS user interface screen 100, which may be provided by the computer through a display device of the automated banking machine responsive to the BIOS setup program. The BIOS screen 100 may enable a user to modify the BIOS configuration saved in the BIOS.

In an exemplary embodiment, the BIOS configuration may include boot order information 102. The boot order information 102 may specify the order of the storage device drives in which the computer may attempt to boot from. In this described exemplary embodiment, the computer may be operative responsive to the order 102 to attempt to boot from the first drive listed in the boot order 102, which in this example includes a floppy disk drive 104. If a floppy disk is not present in the floppy disk drive 104, then the computer may be operative responsive to the boot order 102 to attempt to boot from the next drive on the list, which in this example includes a CD drive 106. If a CD is not present in the CD drive 106, then the computer may be operative responsive to the boot order 102 to attempt to boot from the next drive on the list, which in this example includes a hard drive 108.

In an exemplary embodiment, a bootable floppy disk or CD may include an operating system and at least one service software, such as a diagnostic utility, setup program or other application, which an authorized user may require to service and maintain the machine. When such a bootable floppy disk, or CD bootable media, is inserted into the corresponding floppy disk drive or CD drive, the computer may be operative responsive to the boot order to execute the operating system and service software from the floppy disk or CD, rather than executing an operating system and terminal control software from the hard drive. If no bootable floppy disk or CD bootable media is inserted into the corresponding floppy disk or CD drive, the computer may be operative responsive to the boot order to execute the operating system and terminal control software from the hard drive.

Figure 4:
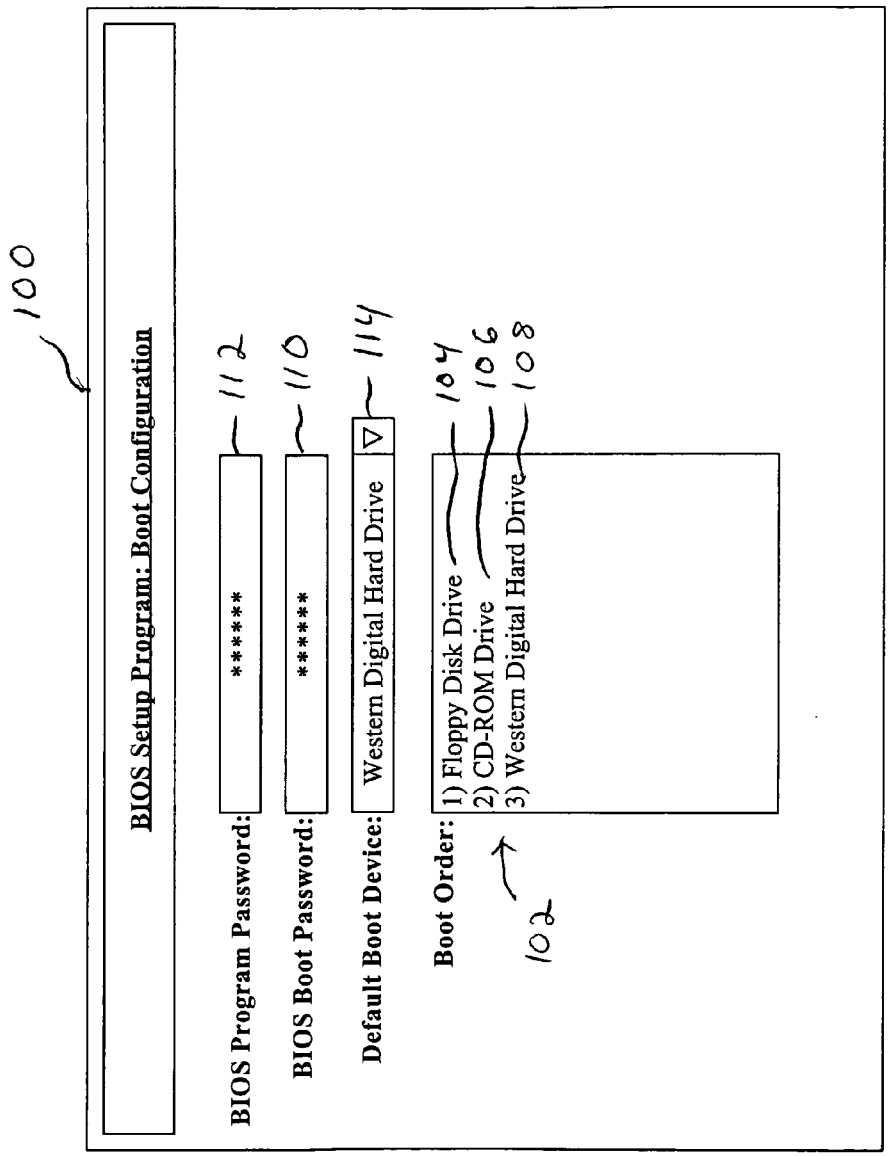
FIG. 4 shows a further exemplary embodiment of a BIOS configuration screen.

In an exemplary embodiment, the BIOS configuration may include a boot password 110 which may be modified by a user using the BIOS screen 100. In an exemplary embodiment, when the computer of the machine is initially started or restarted, the computer responsive to the BIOS may require a user to input a password which corresponds to the boot password 110 stored in the BIOS. To prevent an unauthorized user from modifying the BIOS to remove or change the password, the BIOS program may require a user to input the boot password 110 prior to being provided a BIOS screen 100, which is capable of modifying the boot password 110. As shown in FIG. 4, in exemplary embodiments, the BIOS configuration may also have a specific BIOS program password 112, in addition to a boot password 110. The BIOS program password 112 may be used by the computer to restrict access to the BIOS screen 100, wherein as the boot password 110 may be used to restrict access to the booting of an operating system from one or more storage device drives.

In an exemplary embodiment of the automated banking machine, the computer of the machine responsive to the BIOS may be operative to automatically boot from the particular storage device drive, such as a hard drive, which includes the main operating system and terminal control software components, without requiring a boot password to be entered. However, when a portable bootable media, such as a floppy disk or CD, is present in one of the other storage device drives, the computer responsive to the BIOS may require the BIOS password to be inputted through at least one input device of the machine prior to booting from the portable bootable media.

In one exemplary embodiment, to distinguish between the default storage device drive which does not require a boot password and the alternative storage device drives which require a boot password, the BIOS configuration may specify which of the storage device drives does not require a password and/or which of the storage device drives require a boot password.

Figure 5:
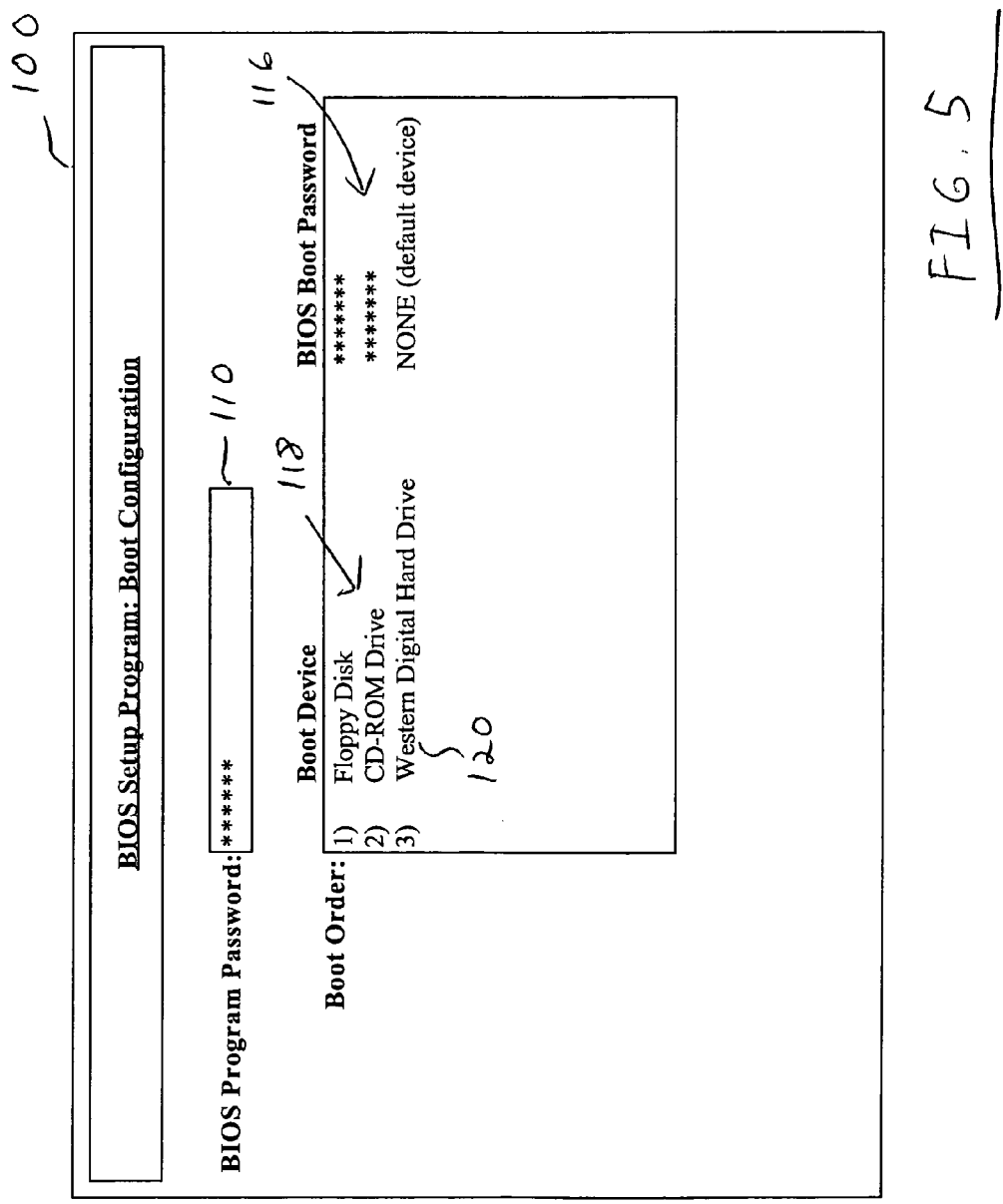
FIG. 5 shows a further exemplary embodiment of a BIOS configuration screen.

As shown in FIG. 4, in an exemplary embodiment, the BIOS configuration may include a default boot device 114, which specifies which of the plurality of storage device drives in the machine corresponds to the default boot device which does not require a boot password. As shown in FIG. 5, in an alternative exemplary embodiment, the BIOS configuration may enable a user to specify for each storage device drive, whether or not the device is associated with a boot password. In this described exemplary embodiment, a BIOS user screen 100, for example, may enable a user to input a different password 116 for each different storage device drive 118. The storage device drive 120 which is not associated with a specific password may correspond to the previously described default storage device drive.

Responsive to the previously described BIOS configuration, a computer of the automated banking machine may be operative to boot according to the following described method. When the automated banking machine is being initially started or restarted, the computer of the ATM may detect whether a bootable media is present in any one of the storage device drives which require, as specified in the BIOS, a boot password. Such storage device drives may, for example, correspond to portable storage device drives, such as a floppy disk drive or CD drive or any other alternative storage device drive which, as specified in the BIOS, requires a boot password.

When a bootable media is detected in an alternative storage device drive, the computer is operative to prompt at least once for a user to input a password, which corresponds to the boot password stored in the BIOS of the computer. Such a prompt may include an output through a display device, or an other output device of the machine, which is indicative of a request to input the boot password through one of the input devices of the machine.

Once a password is inputted by the user, the computer of the machine is operative to determine whether the inputted password corresponds to the boot password stored in the BIOS of the computer. If the inputted password does not match the boot password, the computer may be operative to provide the user with one or more additional chances to input the correct password. However, if after a predetermined number of tries, the user is unable to input a correct password, the computer is operative responsive to the BIOS to boot from the bootable media of the default storage device drive, which is specified in the BIOS as not requiring a password.

In addition, if the computer of the machine detects that a predetermined amount of time has elapsed after the prompt for the password without a password being input through at least one input device of the machine, the computer is also operative responsive to the BIOS to boot from the bootable media of the default storage device drive, which is specified in the BIOS as not requiring a password. When the computer does determine that the inputted password corresponds to the boot password stored in the BIOS, the computer is operative to boot from the alternative storage device drive. In the exemplary embodiment, when the computer determines that no alternative storage device drive includes a bootable media, the computer may be operative responsive to the BIOS to attempt to boot from the bootable media of the default storage device drive, which is specified in the BIOS as not requiring a password.

In exemplary embodiments, where the BIOS includes a boot order, the computer is operative to follow that order in determining which alternative storage device drive to boot from. For example, if both the floppy disk drive includes a bootable floppy disk and the CD drive includes a bootable CD, the computer may be operative responsive to the boot order in the BIOS to determine which drive to attempt to boot to first. As shown in FIG. 3, when the floppy disk drive 104 is listed before the CD drive 106, and the boot password is inputted correctly, the computer may be operative to boot from the floppy disk and not the CD. In this described exemplary embodiment, only when the computer detects that the first listed storage device drive does not include a bootable media will it then check to see if a second listed storage device drive, such as a CD drive 106, includes a bootable CD. If the computer determines that no alternative storage device drive includes a bootable media, the computer may then boot from the bootable media of the default storage device drive, which is specified in the BIOS as not requiring a password.

In exemplary embodiments of the BIOS which include a boot order, it may be possible for the default storage device drive to be listed ahead of any alternative storage device drives. In such cases, if the default storage device drive is detected by the computer, the computer may automatically boot from the default storage device drive without requiring a password regardless of whether a bootable media is inserted in one or more of the alternative storage device drives.

As used herein, booting responsive to a storage device drive corresponds to booting responsive to a boot record stored on the bootable media that is in the storage device drive. Such a boot record may correspond to a master boot record or a partition table stored in the first sector of the bootable media for example. With storage device drives, such as a floppy disk drive or a CD drive, the boot record is located on a portion of a portable and removable bootable media, such as a floppy disk or CD. With storage device drives, such as a hard disk, the boot record is stored on a portion of a bootable media, which may or may not be portable and removable. For example, with some hard drives, the hard drive may be securely mounted to the interior of the machine and the bootable media of the hard drive may correspond to the non removable platters located within the hard drive housing. However, in other exemplary embodiments the hard drive may be portable. For example, hard drives, such as an Iomega JAZ® drive, may have platters located within a portable cartridge which may be removably connected to the IOMEGA JAZ drive.

In other exemplary embodiments, the hard drive may be in operative connection with a USB, PCMCIA or other bus/port interface connector. With such devices, the storage device drive may correspond to the USB or PCMCIA or other bus/port interface of the computer, and the hard drive, with the interface connector, may correspond to the bootable media. Thus, as used herein, the bootable media corresponds to any component which is operative to store a boot record thereon, which a computer may be operative responsive thereto to boot an operating system and/or other software. A storage device drive, as used herein, corresponds to any hardware component of the automated banking machine which the computer may use to read the boot record from the bootable media.

It is to be understood that the bootable media, which includes a boot record, may or may not include all or any portion of the operating system, which is loaded by the computer responsive to the boot record. For example, the boot record may specify that the computer boot an operating system located on a different storage device drive, such as a second hard drive. Also, the boot record may point to a boot loader program, such as LILO or GRUB, which is installed on one of the storage device drives. Such a boot loader may cause the computer to output a user interface, which enables a user to select from a plurality of different operating systems or configurations of operating system to boot from.

Computer software used in operating the automated transaction machines and connected computers, may be loaded from articles or computer readable media of various types into the respective computers. Such computer software may be included on and loaded from one or more articles, such as diskettes or compact disks. Such software may also be included on articles such as hard disk drives, tapes or read only memory devices. Other articles, which include data representative of the instructions for operating computers in the manner described herein, are suitable for use in achieving operation of transaction machines and systems in accordance with exemplary embodiments.

In exemplary embodiments, the articles or computer readable media may include flash software files which, when executed by the computer of the machine, may be operative to update the BIOS of the computer, with an exemplary embodiment of a BIOS described herein.

The exemplary embodiments of the automated banking machines and systems described herein have been described with reference to particular software components and features. Other embodiments of the invention may include other or different software components which provide similar functionality.

Thus, the new automated banking machine system and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith, shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:
an automated banking machine that operates responsive to data read from data bearing records to cause financial transfers, including:
a card reader operative to read card data on user cards corresponding to financial accounts;
a cash dispenser;
at least one input device operative to receive manual user inputs;
at least one computer including a BIOS, wherein the at least one computer is in operative connection with the card reader, the cash dispenser and the at least one input device, wherein the BIOS includes a BIOS boot password, and wherein the BIOS specifies a default bootable media which does not require a boot password, wherein the at least one computer is operative to detect a connection of a portable bootable media with the at least one computer;
a storage device drive in operative connection with the at least one computer, wherein the storage device drive corresponds to the default bootable media specified in the BIOS, wherein when the at least one computer detects the connection of the portable bootable media, the at least one computer is operative to require input of at least one manual input that corresponds to the BIOS boot password through the at least one input device prior to booting responsive to a boot record associated with the portable bootable media, wherein when the computer does not detect a connection of a portable bootable media, the at least one computer is operative to boot responsive to a boot record on the specified default bootable media without requiring user input of the BIOS boot password.

2. The apparatus according to claim 1, wherein when a connection of the portable bootable media is detected by the at least one computer and when at least one manual input corresponding to the BIOS boot password has not been provided through the at least one input device within a predetermined amount of time, the at least one computer is operative to automatically boot responsive to the boot record associated with the default bootable media.

3. The apparatus according to claim 1, wherein when a connection of the portable bootable media is detected by the at least one computer and when a manual input of at least one password provided through the at least one input device does not correspond to the BIOS boot password, the at least one computer is operative to automatically boot responsive to the boot record associated with the default bootable media.

4. The apparatus according to claim 1, wherein the storage device drive includes a hard drive mounted within a housing of the automated banking machine.

5. The apparatus according to claim 4, further comprising a further storage device drive in operative connection with the at least one computer in the housing of the automated banking machine, wherein the further storage device drive is operative to read the boot record from the portable bootable media.

6. The apparatus according to claim 5, wherein the portable bootable media includes a floppy disk.

7. The apparatus according to claim 5, wherein the portable bootable media includes a CD.

8. The apparatus according to claim 5, wherein the portable bootable media includes a DVD.

9. The apparatus according to claim 1, wherein the at least one computer includes a USB port, wherein the at least one computer is operative to detect a connection of a portable bootable media to the USB port.

10. The apparatus according to claim 9, wherein the portable bootable media includes a portable hard drive.

11. The apparatus according to claim 1, wherein the at least one computer includes a BIOS setup program, wherein the at least one computer is operative to require input through the at least one input device of at least one manual input that corresponds to the BIOS boot password to enable access to modify the BIOS through the BIOS setup program.

12. The apparatus according to claim 1, wherein the at least one computer includes a BIOS setup program and a BIOS program password, wherein the at least one computer is operative to require input through the at least one input device of at least one manual input corresponding to the BIOS program password to enable access to modify the BIOS with the BIOS setup program, wherein the BIOS program password does not correspond to the BIOS boot password.

13. The apparatus according to claim 1, wherein when the at least one computer has booted responsive to the boot record of the default bootable media, the at least one computer is operative to cause the cash dispenser to dispense cash responsive at least in part to at least one further manual input through the at least one input device.

14. Apparatus comprising:
an automated banking machine that operates responsive to data read from data bearing records to cause financial transfers, including:
a card reader operative to read card data on user cards corresponding to financial accounts;
at least one transaction function device that is operative to at least one of receive and dispense at least one of cash and checks;
at least one input device operative to receive manual user inputs;
at least one computer including a BIOS, wherein the at least one computer is in operative connection with the card reader, the at least one transaction function device, and the at least one input device, wherein the BIOS includes a boot password, and wherein the BIOS specifies a default bootable media which does not require a boot password, wherein the at least one computer is operative to detect a connection of a portable bootable media with the at least one computer;
a storage device drive in operative connection with the at least one computer, wherein the storage device drive corresponds to the default bootable media specified in the BIOS, wherein when the at least one computer detects the connection of the portable bootable media, the at least one computer is operative to require input of at least one manual input that corresponds to the boot password through the at least one input device prior to booting responsive to a boot record associated with the portable bootable media, wherein when the computer does not detect a connection of a portable bootable media, the at least one computer is operative to boot responsive to a boot record on the specified default bootable media without requiring user input of the boot password.

15. The apparatus according to claim 14, wherein the at least one transaction function device includes a cash dispenser.

16. The apparatus according to claim 14, wherein the at least one transaction function device includes a depository mechanism.

17. The apparatus according to claim 14, wherein the at least one transaction function device includes a cash recycler.

18. Apparatus comprising:
an automated banking machine that operates responsive to data read from data bearing records to cause financial transfers, including:
a card reader operative to read card data on user cards corresponding to financial accounts;
at least one transaction function device that is operative to at least one of receive and dispense at least one of cash and checks;
at least one input device operative to receive manual user inputs;
a first storage device including a boot record;
at least one computer including a BIOS, wherein the at least one computer is in operative connection with the card reader, the at least one transaction function device, the at least one input device, and the first storage device, wherein the BIOS includes a boot password, and wherein the BIOS specifies a default bootable media which does not require a boot password, wherein the first storage device corresponds to the default bootable media specified in the BIOS,
wherein the at least one computer is operative to detect a connection of a second storage device with the at least one computer, which second storage device does not correspond to the default bootable media,
wherein when the at least one computer detects the connection of the second storage device, the at least one computer is operative to require input of at least one manual input that corresponds to the boot password through the at least one input device prior to booting responsive to a boot record associated with the second storage device,
wherein when the computer does not detect a connection of the second storage device, the at least one computer is operative to boot responsive to the boot record on the first storage device without requiring user input of the boot password.

* * * * *